(12) United States Patent
Lee (10) Patent No.: US 7,765,082 B2
(45) Date of Patent: *Jul. 27, 2010

(54) SYSTEM FOR OPTIMAL ALIGNMENT OF A SHAFT OF A GAS TURBINE

(75) Inventor: Robert M. Lee, Magnolia, MA (US)

(73) Assignee: Axiam, Incorporated, Gloucester, MA (US)

( * ) Notice: Subject to any disclaimer, the term of this patent is extended or adjusted under 35 U.S.C. 154(b) by 685 days.

This patent is subject to a terminal disclaimer.

(21) Appl. No.: 11/179,339

(22) Filed: Jul. 12, 2005

(65) Prior Publication Data
US 2007/0014660 A1    Jan. 18, 2007

Related U.S. Application Data (63) Continuation-in-part of application No. 11/090,963, filed on Mar. 25, 2005, which is a continuation of application No. 09/950,942, filed on Sep. 11, 2001, now Pat. No. 6,898,547.

(60) Provisional application No. 60/231,820, filed on Sep. 11, 2000.

(51) Int. Cl.
G01D 1/00 (2006.01)
G06F 15/00 (2006.01)

(52) U.S. Cl. .................................... 702/127

(58) Field of Classification Search .............. 702/34, 702/42, 54, 56, 127, 182, 183, 185; 60/239, 60/624, 39.34, 804, 39.37, 39.42, 39.43, 60/39.44, 39.58, 735, 805, 330, 331, 340, 60/341, 345, 349, 361, 363, 364, 366, 697; 475/33, 35, 45, 47, 59, 62, 113; 73/1.27, 73/1.28, 112.01, 116.03, 861.33, 861.353, 73/861.79, 861.84, 861.87, 861.92; 415/55.1, 415/902, 903, 90; 137/119.07, 332, 499; 701/100; 477/30, 53, 56; 184/6.11

See application file for complete search history.

(56) References Cited

U.S. PATENT DOCUMENTS 4,131,387 A    12/1978    Kazin et al.

(Continued)

OTHER PUBLICATIONS

Merriam Webster's onlines dictionary, http://www.merriam-webster.com/dictionary/dimensions, p. 1.*

(Continued)

Primary Examiner—Aditya Bhat
(74) Attorney, Agent, or Firm—Hamilton, Brook, Smith & Reynolds, PC (57) ABSTRACT

A system for substantially aligning a shaft of a turbine engine with components of the turbine engine. The system includes a horizontal bed adapted to support a shaft in a horizontal orientation, at least one stand for rotatably supporting the shaft in the horizontal orientation, at least one sensor for measuring characteristics associated with the shaft, and a determination module receiving the measured characteristics and outputting alignment information of the shaft with components of the turbine engine based on the measured characteristics.

20 Claims, 6 Drawing Sheets

U.S. PATENT DOCUMENTS

| | | | | |
|---|---|---|---|---|
| 4,428,126 | A * | 1/1984 | Banks | 33/412 |
| 4,538,455 | A * | 9/1985 | Klufas | 73/118.1 |
| 4,709,485 | A * | 12/1987 | Bowman | 33/228 |
| 5,373,922 | A | 12/1994 | Marra | |
| 5,564,656 | A | 10/1996 | Gilbert | |
| 5,689,435 | A | 11/1997 | Umney et al. | |
| 5,768,149 | A | 6/1998 | Umney et al. | |
| 5,806,161 | A * | 9/1998 | Schneider | 29/271 |
| 5,821,412 | A | 10/1998 | Bryant et al. | |
| 6,148,518 | A * | 11/2000 | Weiner et al. | 29/889.2 |
| 6,148,533 | A * | 11/2000 | Hutter | 33/645 |
| 6,341,419 | B1 | 1/2002 | Forrester et al. | |
| 6,452,179 | B1 | 9/2002 | Coates et al. | |
| 6,473,794 | B1 | 10/2002 | Guheen et al. | |
| 6,482,094 | B2 * | 11/2002 | Kefes | 464/182 |
| 6,519,571 | B1 | 2/2003 | Guheen et al. | |
| 7,175,342 | B2 * | 2/2007 | Tanaka et al. | 374/55 |
| 2002/0122583 | A1 | 9/2002 | Thompson | |

OTHER PUBLICATIONS

Axiam Incorporated Product Brochure of GMX 4000 Smart Stack™ Systems, "For Assembly of Aircraft Jet Engines and Industrial Gas Turbines", (1991).

Axiam Incorporated Product Brochure of Axiam's Rotor Assembly Process, Tools & Training, "Build Engine Rotors Within Compliance Reduce Turn Time, Decrease Vibration And Cut Costs" (1991).

* cited by examiner

SYSTEM FOR OPTIMAL ALIGNMENT OF A SHAFT OF A GAS TURBINE

RELATED APPLICATIONS

This application is a continuation-in-part of U.S. application Ser. No. 11/090,963, filed Mar. 25, 2005, which is a continuation of U.S. application Ser. No. 09/950,942, filed on Sep. 11, 2001, now U.S. Pat. No. 6,898,547, issued on May 24, 2005, which claims the benefit of U.S. Provisional Application No. 60/231,820, filed on Sep. 11, 2000, the entire teachings of which are herein incorporated by reference.

BACKGROUND OF THE INVENTION

A gas turbine, typically called a 'jet' engine, was introduced by Frank Whittle in 1930s. The gas turbine is an internal combustion engine. In the internal combustion engine, air is compressed, fuel added, the mixture ignited, and the rapid expansion of the resultant hot gas produces the power. The combustion in a jet engine is continuous and its power results from expanding gas being forced out of the rear of the engine. The expanding gas flow is an action which creates a reaction of equivalent force or thrust. The thrust is transmitted through the engine to the aircraft, propelling it through the air.

The gas turbine includes three main sections: a compressor section, a combustion section; and a turbine section. The compressor section draws air into the engine, pressurizes it, and delivers it to the combustion chamber. The combustion chamber receives air from the compressor section and mixes the air with fuel sprayed from nozzles in the front of the chamber. The mixture is burned at temperatures up to 20000° C. to generate the maximum possible heat energy. The turbine section extracts energy from the hot exhaust gases to drive the compressor section.

The compressor section includes a low-pressure compressor and a high pressure compressor. Each compressor includes a plurality of discs which are bolted together to form a drum/rotor. Rotor blades are mounted on the drum. The turbine section includes a low-pressure turbine and a high pressure turbine. Like each compressor, each turbine includes a plurality of discs which are bolted together to form a drum/rotor. Rotor blades are mounted on the drum. Each compressor is driven from a respective turbine by a single shaft.

Prior to assembly, various characteristics of each disc are measured and used as inputs to a software program that provides optimal assembly information for each drum/rotor based on the measured characteristics. The compressor section or turbine section is then assembled accordingly. After each compressor section and turbine section is assembled, various characteristics of each compressor and turbine are measured and used as inputs to a software program that provides optimal assembly information for the gas turbine (whole engine) based on the measured characteristics. The gas turbine/engine is then assembled accordingly. Example software programs for assembling engines include: "Shaft-Mate™" by Axiam, Incorporated of Gloucester, Mass.

SUMMARY OF THE INVENTION

The gas turbine is assembled by bolting the shaft onto the low-pressure turbine. In turn, the high-pressure turbine, high-pressure compressor, and low-pressure compressor are positioned over the shaft and assembled based on the optimal assembly information provided from the above-mentioned software program.

Correct alignment of the shaft on the turbines and the compressors is critical to optimal gas turbine assembly because the shaft drives the gas turbine compressors. Incorrect alignment of the shaft causes vibrations that can lead to a loosening of the coupling of gas turbine components and engine fatigue to name a few. However, prior measuring techniques are inadequate for measuring shaft characteristics mainly due to shaft size, shaft configuration, and shaft orientation. Therefore, a need exists to adequately measure characteristics of a shaft of a gas turbine and use the measured characteristics to determine optimal shaft alignment information. The present invention is directed to these needs.

The present invention provides a system for substantially aligning a shaft of a turbine engine with components of the turbine engine. The system includes a horizontal bed, a shaft adapted to be coupled to the horizontal bed in a horizontal orientation, at least one stand for rotatably supporting the shaft in the horizontal orientation, at least one sensor for measuring characteristics associated with the shaft, and a determination module receiving the measured characteristics and outputting alignment information of the shaft with components of the turbine engine based on the measured characteristics.

The measured characteristics can include roundness, flatness, concentricity, concentricity angle, runout, runout angle, perpendicularity, perpendicularity angle, perpendicular plane deviation™, centerline deviation™, centerline deviation angle, biplane deviation™, and biplane deviation angle™. The alignment information can include at least one member selected from the group comprising: bolt-hole alignment and spline coupling alignment.

The horizontal bed includes a variable speed drive for rotating the shaft. In one embodiment, the variable speed drive rotates the shaft at a speed from zero to five revolutions per minute. The stand can include two ultra precision rollers for allowing the shaft to rotate freely about its axis.

A proximal end of the shaft is coupled to the variable speed drive through a drive coupling, wherein the drive coupling constrains axial motion of the shaft and prevents backlash during rotation. In one embodiment, the proximal end of the shaft includes a spline, wherein at least one sensor can be used to measure characteristics associated with the spline of the proximal end of the shaft. The at least one sensor can include a toothed wheel for rotatably engaging the spline, wherein the toothed wheel provides pitch diameter data of the spline. Each tooth of the wheel can have a radius form that corresponds to the pitch diameter of the spline.

A distal end of the shaft is coupled to a stub shaft for rotatably engaging at least one stand, wherein coupling of the distal end of the shaft to the stub shaft forms a groove to allow a face of the distal end of the shaft to be measured. At least one sensor can be used to measure characteristics associated with the face of the distal end of the shaft.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
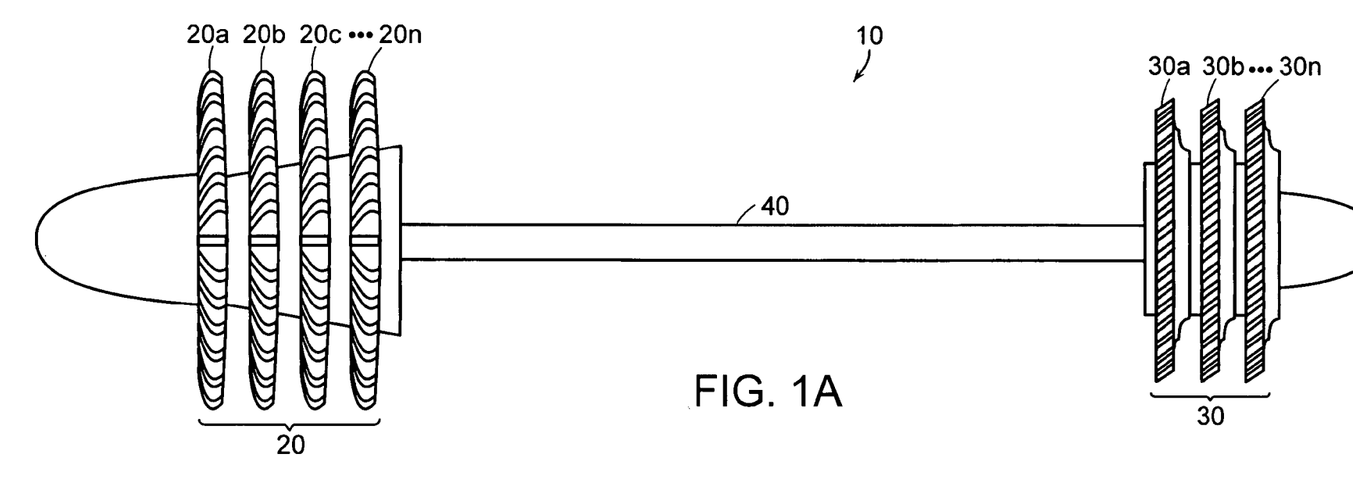
FIG. 1A shows a plan view of a low-pressure turbine spool.

FIG. 1A shows a low-pressure spool 10 of a gas turbine. The low-pressure spool 10 includes a low-pressure compressor 20, a low-pressure turbine 30, and a low-pressure shaft 40. The low-pressure compressor 20 includes a plurality of discs 20a . . . 20n. The low-pressure turbine 30 includes a plurality of discs 30a . . . 30n.

Figure 1B:
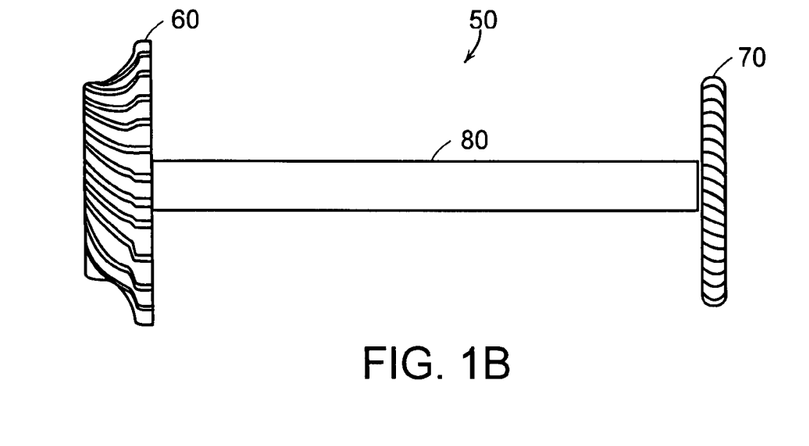
FIG. 1B shows a plan view of a high-pressure turbine spool.

FIG. 1B shows a high-pressure spool 50 of a gas turbine. The high-pressure spool 50 includes a high-pressure compressor 60, a high-pressure turbine 70, and a high-pressure shaft 80. The high pressure shaft 80 rotates about the low-pressure shaft 40. In some engine designs, the low-pressure shaft 40 and the high-pressure shaft 80 are the same shaft.

Assembly of the low-pressure spool 10 and high pressure spool 50 is a follows:

Characteristic information of the high-pressure compressor 60 is measured and used by a software program (e.g. "ShaftMate™" by Axiam, Incorporated of Gloucester, Mass.) to output correct alignment information for aligning the high-pressure compressor 60, the high-pressure turbine 70 and the high pressure shaft 80. In instances were the high-pressure compressor 60 includes multiple discs, the steps associated with assembly of the low-pressure turbine 30 described below are followed.

Characteristic information of the high-pressure turbine 70 is measured and used by the software program to output correct alignment information for aligning the high-pressure compressor 60, the high-pressure turbine 70 and the high pressure shaft 80. In instances were the high pressure turbine 70 includes multiple discs, the steps associated with assembly of the low-pressure turbine 30 described below are followed.

Using the system described below, characteristic information of the high pressure shaft 80 is measured and used by the software program to output correct alignment information for coupling the high-pressure shaft 80 to the high-pressure turbine 70 and the high-pressure compressor 60.

The software program uses the stored characteristic information of the high-pressure compressor 60, the high-pressure turbine 70, and the high pressure shaft 80 to provide the correct alignment information. The correct alignment information is output to allow the components to be coupled together. The high-pressure compressor 60 is aligned and inserted onto high-pressure shaft 80 using the outputted information. Next, the high-pressure turbine 70 is aligned and bolted to the high-pressure shaft 80 the using the outputted information. The high-pressure spool 50 is now complete.

Characteristic information for each individual discs 30a . . . 30n of the low-pressure turbine 30 is measured and used by the software program to output correct alignment information for the low-pressure turbine 30. The discs 30a . . . 30n are placed in a hydraulic press and aligned based on the output from the software program. The hydraulic press is engaged and the discs 30a . . . 30n are bolted together to form the low-pressure turbine 30. Characteristic information of the assembled low-pressure turbine 30 is measured and stored for later use.

Characteristic information for each individual discs 20a . . . 20n of the low-pressure compressor 20 is measured and used by a software program to output correct alignment information for the low-pressure compressor 20. The discs 20a . . . 20n are placed in a hydraulic press and aligned based on the output from the software program. The hydraulic press is engaged and the discs 20a . . . 20n are bolted together to form the low-pressure compressor 20. Characteristic information of the assembled low-pressure compressor 20 is measured and stored for later use.

Using the system described below, characteristic information of the low-pressure shaft 40 is measured and used by the software program to output correct alignment information for coupling the low-pressure shaft 40 to the low-pressure turbine 30 and the low-pressure compressor 20.

The software program uses the stored characteristic information of the low-pressure compressor 20, low-pressure turbine 30, low-pressure shaft 40, and high-pressure spool 50 to provide the correct alignment information of the gas turbine spool assembly. The low-pressure compressor 20 is aligned and coupled to the low-pressure shaft 40 using the outputted information. Next, the high-pressure spool 50 is aligned and inserted over the low-pressure shaft 40 using the outputted information such that the high-pressure compressor 60 is in close proximity to the low-pressure compressor 20. Next, the low-pressure turbine 30 is aligned and bolted to the low-pressure shaft 40 using the outputted information. The low-pressure spool 10 and gas turbine spool assembly is now complete.

It should be understood by one skilled in the art that the assembly of the low-pressure compressor 20, the high-pressure compressor 60, the high-pressure turbine 70, and the low-pressure turbine 30 does not have to be sequential as described above. In instances were a single shaft is used the high-pressure compressor 60 and the high pressure turbine 70 are coupled to the single shaft with techniques known in the art.

Figure 2:
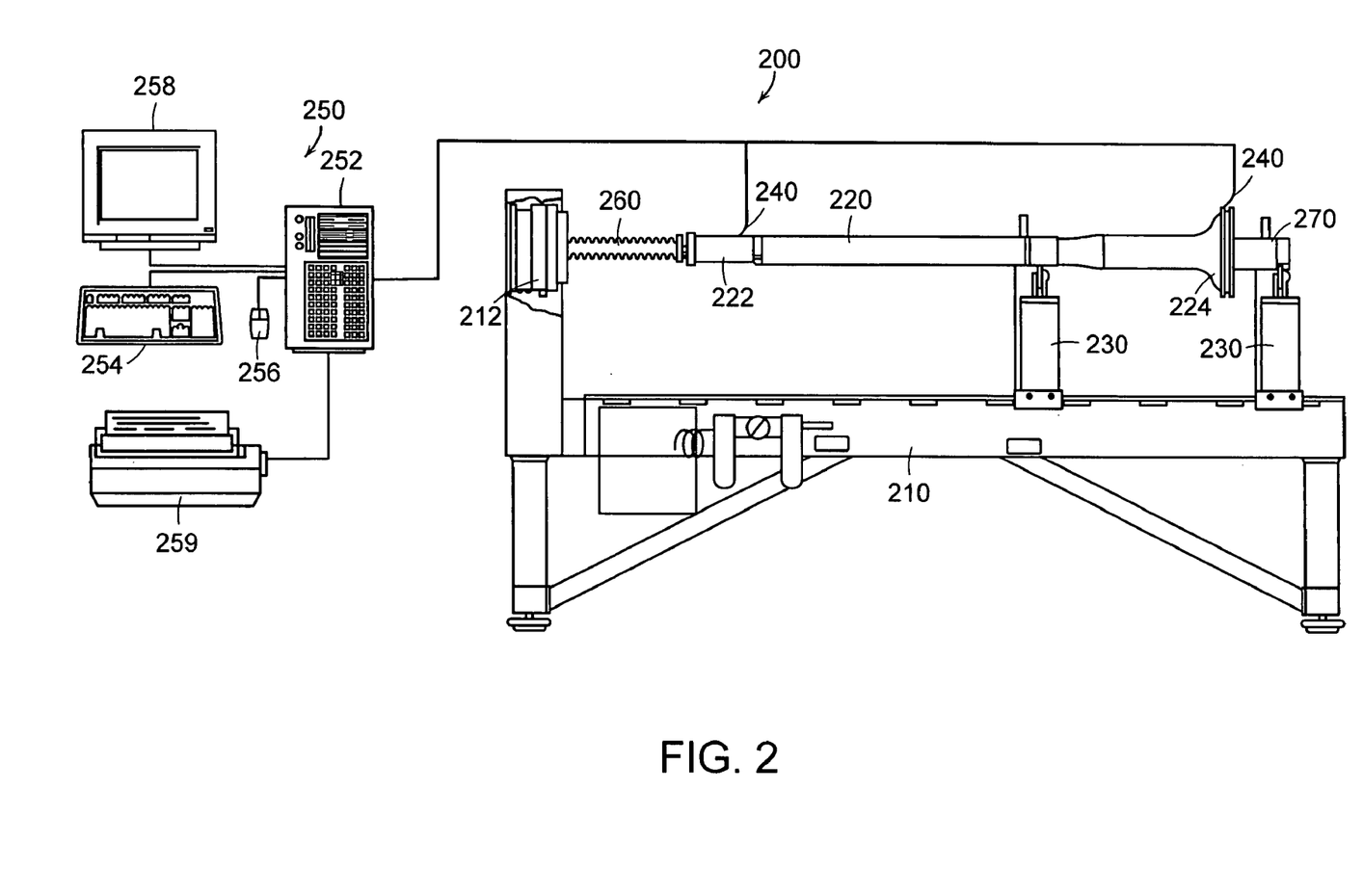
FIG. 2 shows a system diagram of one embodiment of the present invention.

FIG. 2 shows a system diagram of a system 200 of the present invention for measuring characteristic information of a shaft of a gas turbine. The system 200 includes a horizontal base or bed 210, a gas turbine shaft 220, at least one stand 230, at least one sensor or probe 240 and a determination module 250. The horizontal base 210 includes a variable speed drive 212. The variable speed drive 212 preferably rotates the shaft 220 at a speed from 0 to 5 revolutions per minute (RPM). In the configuration as shown, two stands 230 rotatably support the shaft 220 in a horizontal orientation.

The system 200 further includes a drive coupling 260 and a stub shaft 270. The drive coupling 260 couples the shaft 220 to the variable speed drive 212. The drive coupling 260 is a zero backlash drive coupling that constrains axial motion of the shaft 220 and prevents backlash during shaft 220 rotation. The stub shaft 270 couples to the shaft 220 to provide additional support during rotation.

The shaft 220 includes a spline 222 and a hub 224. At least one sensor or probe 240 measures characteristics of either the spline 222 or the hub 224 while the shaft 220 is rotating. The measured characteristics include roundness, flatness, concentricity, concentricity angle, runout, runout angle, perpendicularity, perpendicularity angle, perpendicular plane deviation™, centerline deviation™, centerline deviation angle, biplane deviation™, and biplane deviation angle™. The probe 240 can be a digital probe or an analog probe. The probe 240 converts linear motion into an electrical signal that is used by the determination module 250 to provide a best-fit assembly solution of the shaft to other modules/sections of the gas turbine. The probe 240 provides axial and radial accuracy of 20-30 millionths of an inch.

The determination module 250 can include a central processing unit (CPU) located in a housing 252, an input device such as a keyboard 254 or a mouse 256, and a display device such as a monitor 258 or a printer 259. The CPU runs a software program which uses the measured characteristic data to determine the best-fit assembly solution of the shaft 220. The best-fit assembly solution is output to one or both of the display devices 258, 259.

Figure 3A:
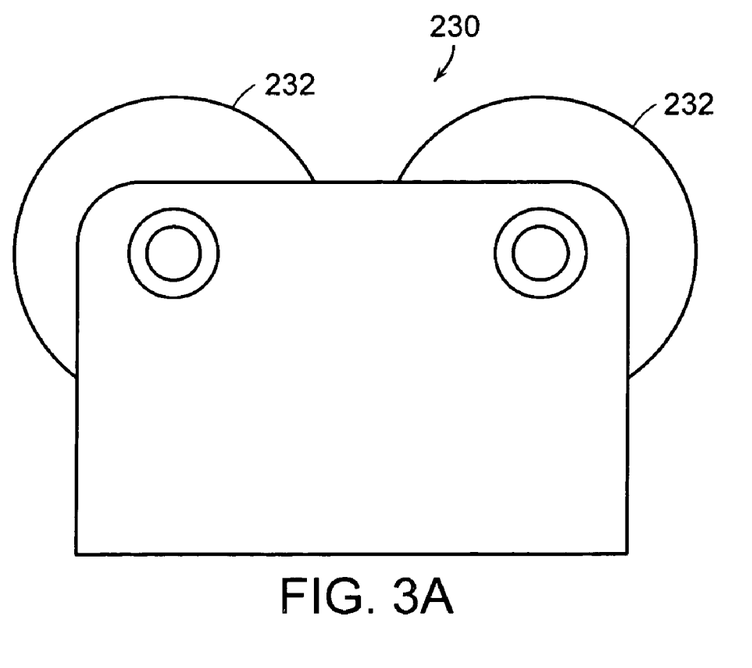
FIG. 3A shows a side view of a stand of the system of FIG. 2.
Figure 3B:
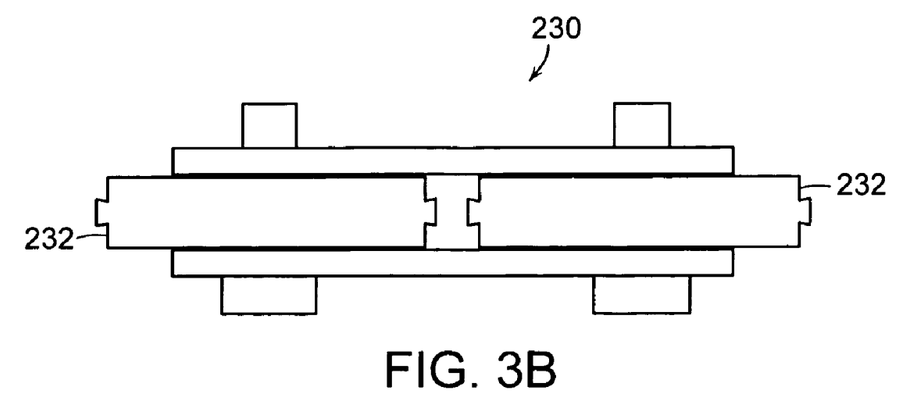
FIG. 3B shows a top view of the stand of FIG. 3A.

FIGS. 3A and 3B show respective side and top views of the stand 230. The stand 230 includes at least two diametrically opposed wheels or rollers 232 for rotatably supporting the shaft 220. The wheels 232 are ultra precision rollers and provide near frictionless (free) rotation of the shaft 220 about its axis.

Figure 4:
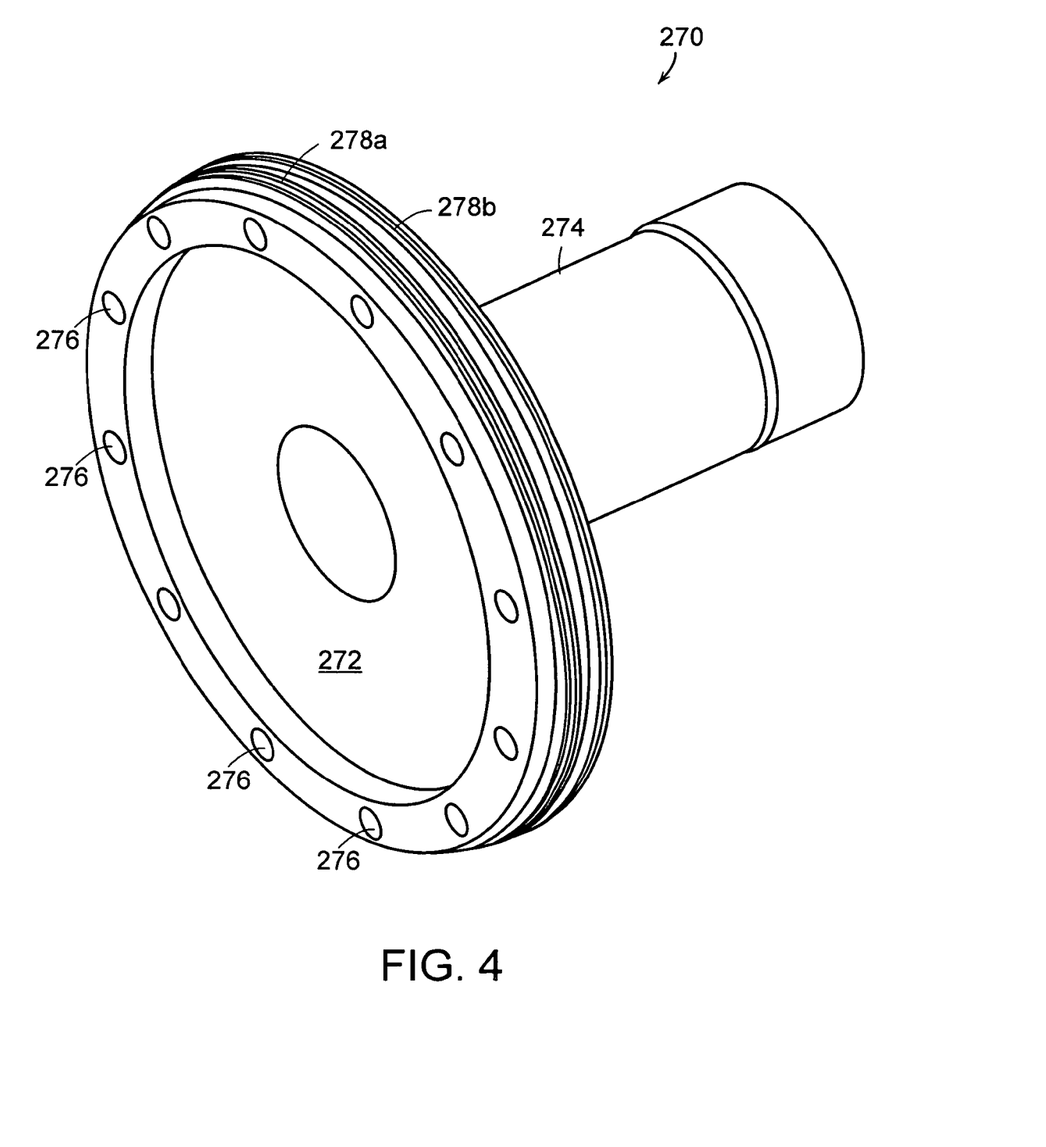
FIG. 4 shows a perspective view of a stub shaft of the system of FIG. 2.

FIG. 4 is a perspective view of the stub shaft 270. The stub shaft includes a hub 272 and a short shaft 274. The hub includes a plurality of bolt holes 276 for coupling the stub shaft 270 to the shaft 220. The short shaft 274 rotatably engages wheel 232 of the stand 230 as shown in FIG. 2. The hub 272 further includes an inner cylindrical ring 278a and an outer cylindrical ring 278b. The inner cylindrical ring 278a is smaller in diameter than the outer cylindrical ring 278b such that when the stub shaft 270 is coupled to the shaft 220 a groove is formed and allows measurement of a surface of the shaft 220 by probes/sensors 240.

Figure 5:
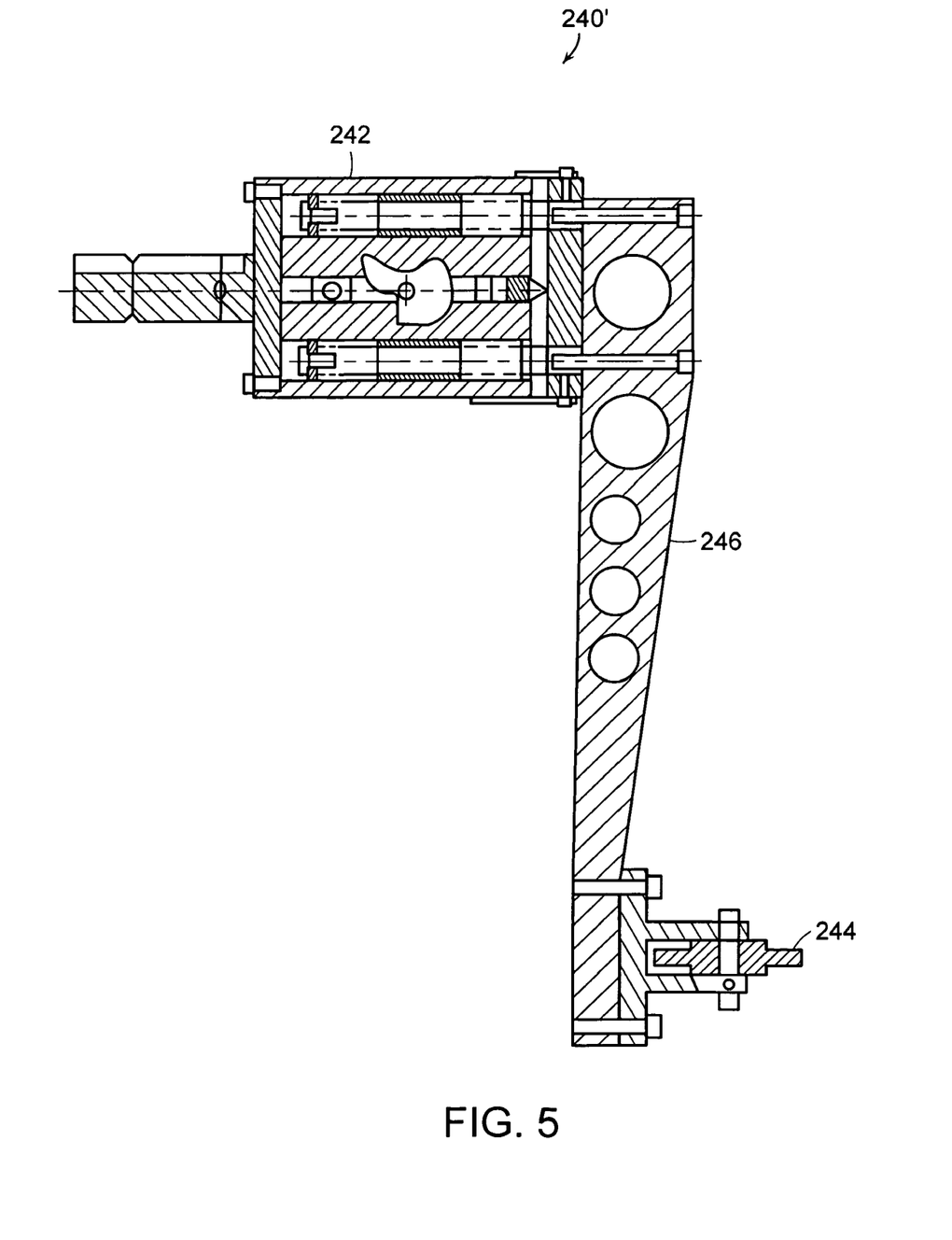
FIG. 5 shows a cross-sectional view of a spline sensor of the present invention.

FIG. 5 shows a cross-sectional view of a spline probe 240'. The spline probe 240' includes a sensing element 242, an optional arm 246, and a measurement head 244. The sensing element 242 receives measured data from the measurement head 244 and transmits the measured data to the determination module 250 of FIG. 2. In one embodiment, the measurement head or toothed wheel 244 can be directly coupled to the sensing element 242.

Figure 6A:
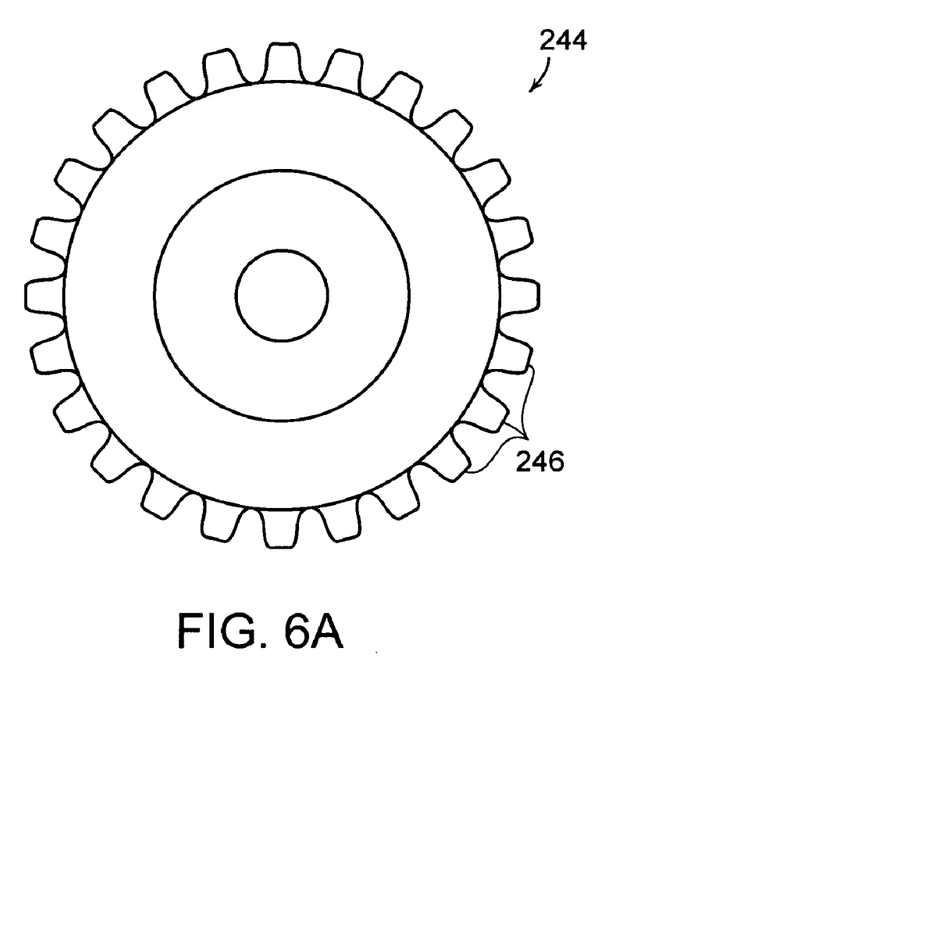
FIG. 6A shows a side view of a wheel of the spline sensor of FIG. 5.
Figure 6B:
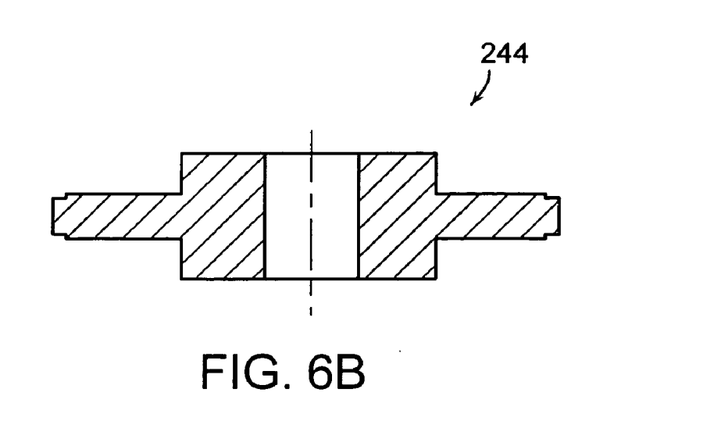
FIG. 6B shows a top view of the wheel of FIG. 6A.

FIGS. 6A and 6B show respective side and cutaway views of the measurement head 244 of FIG. 5. The measurement head 244 provides pitch data diameter of the spline to the sensing element 242. The measurement head 244 includes a plurality of teeth 246 for rotatably engaging the spline 222 (FIG. 2) of the shaft 220 (FIG. 2). The teeth 246 have a radius form that corresponds to the pitch diameter of the spline 222.

While this invention has been particularly shown and described with references to preferred embodiments thereof, it will be understood by those skilled in the art that various changes in form and details may be made therein without departing from the scope of the invention encompassed by the appended claims.

What is claimed is:

1. An assembling system for forming at least a portion of a turbine engine to be built that aligns a shaft of the turbine engine to be built with components of the turbine engine to be built; comprising:
   a horizontal bed adapted to hold a subject shaft in a horizontal orientation;
   at least one stand coupled to the horizontal bed for rotatably supporting the subject shaft in the horizontal orientation;
   at least one sensor for measuring dimensions of the subject shaft while the subject shaft is in the horizontal orientation on the horizontal bed;
   a determination module receiving the measured dimensions and determining assembly instructions to form at least a portion of the turbine engine to be built; which include assembly alignment information of the shaft with respect to components of the turbine engine to be built based on the measured dimensions; and
   outputting the assembly instructions in a manner such that the alignment information enables formation of at least the portion of the turbine engine to be built having the components optimally aligned on the subject shaft.

2. The assembling system of claim 1, wherein the horizontal bed includes a variable speed drive for rotating the subject shaft.

3. The assembling system of claim 2, wherein the variable speed drive rotates the subject shaft at a speed from zero to five revolutions per minute.

4. The assembling system of claim 2, wherein a proximal end of the subject shaft is coupled to the variable speed drive through a drive coupling.

5. The assembling system of claim 4, wherein the drive coupling constrains axial motion of the subject shaft and prevents backlash during rotation.

6. The assembling system of claim 4, wherein a distal end of the subject shaft is coupled to a stub shaft for rotatable engagement by at least one of the stands.

7. The assembling system of claim 6, wherein coupling of the distal end of the subject shaft to the stub shaft forms a groove to allow a face of the distal end of the subject shaft to be measured.

8. The assembling system of claim 7, wherein at least one sensor measures dimensions associated with the face of the distal end of the subject shaft.

9. The assembling system of claim 4, wherein the proximal end of the subject shaft includes a spline.

10. The assembling system of claim 9, wherein at least one sensor measures dimensions associated with the spline of the proximal end of the subject shaft.

11. The assembling system of claim 10, wherein the at least one sensor includes a toothed wheel for rotatably engaging the spline.

12. The assembling system of claim 11, wherein the toothed wheel provides pitch diameter data of the spline.

13. The assembling system of claim 12, wherein each tooth of the wheel has a radius form that corresponds to the pitch diameter of the spline.

14. The assembling system of claim 1, wherein each stand includes two ultra precision rollers for allowing the subject shaft to rotate freely about its axis.

15. The assembling system of claim 1, wherein the measured dimensions include at least one member selected from the group comprising: roundness, flatness, concentricity, concentricity angle, runout, runout angle, perpendicularity, perpendicularity angle, perpendicular plane deviation, centerline deviation, centerline deviation angle, biplane deviation, and biplane deviation angle.

16. The assembling system of claim 1, wherein the assembly alignment information includes at least one member selected from the group comprising: bolt-hole alignment and spline coupling alignment.

17. An assembling system for aligning a shaft of a turbine engine to be built with components of the turbine engine to be built; comprising:
   means for rotating a shaft in a horizontal plane;
   means for supporting the shaft in the horizontal orientation;
   means for measuring dimensions of the shaft while in horizontal orientation;
   means for determining assembly instructions to form at least a portion of the turbine engine to be built; which include assembly alignment information of the shaft with respect to components of the turbine engine based on the measured dimensions; and means for outputting the assembly instructions in a manner such that the alignment information enables formation of at least the portion of the turbine engine to be built having the components optimally aligned on the subject shaft.

18. An assembly method for forming at least a portion of a turbine engine to be built by aligning a shaft of the turbine engine to be built with components of the turbine engine to be built; comprising:

providing a horizontal bed adapted to hold the subject shaft in a horizontal orientation;

using at least one stand coupled to the horizontal bed, rotatably supporting the subject shaft in a horizontal orientation;

measuring dimensions of the subject shaft while the subject shaft is in the horizontal orientation on the horizontal bed;

using the measured dimension in a computer module, determining assembly instructions to form at least a portion of a turbine engine to be built; which include assembly alignment information of the subject shaft with respect to components of the turbine engine to be built based on the measured dimensions; and outputting the assembly instructions in a manner such that the alignment information enables formation of at least the portion of the turbine engine to be built having the components optimally aligned on the subject shaft.

19. The assembly method of claim 18, wherein the measured dimensions include at least one member selected from the group comprising: roundness, flatness, concentricity, concentricity angle, runout, runout angle, perpendicularity, perpendicularity angle, perpendicular plane deviation, centerline deviation, centerline deviation angle, biplane deviation, and biplane deviation angle.

20. The assembly method of claim 18, wherein the assembly alignment information includes at least one member selected from the group comprising: bolt-hole alignment and spline coupling alignment.

* * * * *